Figure 1:
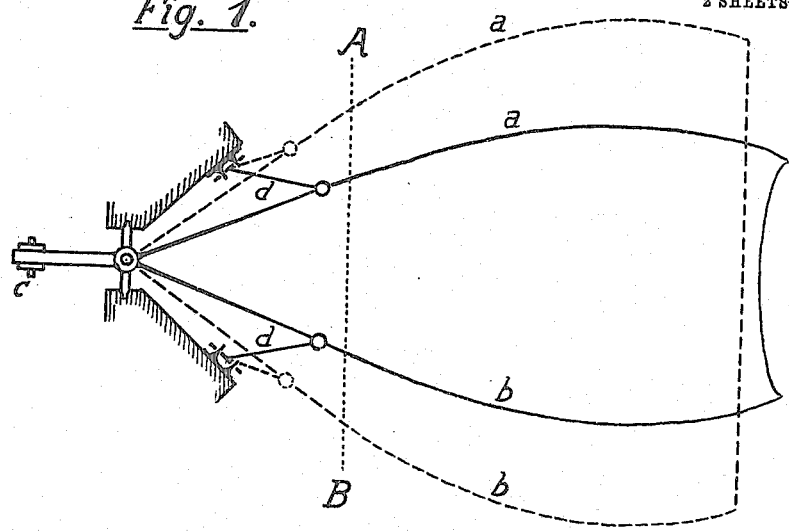

G. VORNDRAN.
FLYING MACHINE.
APPLICATION FILED MAY 31, 1913.

1,135,638.

Patented Apr. 13, 1915.

2 SHEETS—SHEET 1.

Witnesses:—
Charles B Crompton
May G. Luttrell

G. Vorndran
Inventor
By Elwoyder Marks
Attorney

G. VORNDRAN.
FLYING MACHINE.
APPLICATION FILED MAY 31, 1913.
1,135,638.
Patented Apr. 13, 1915.
2 SHEETS—SHEET 2.
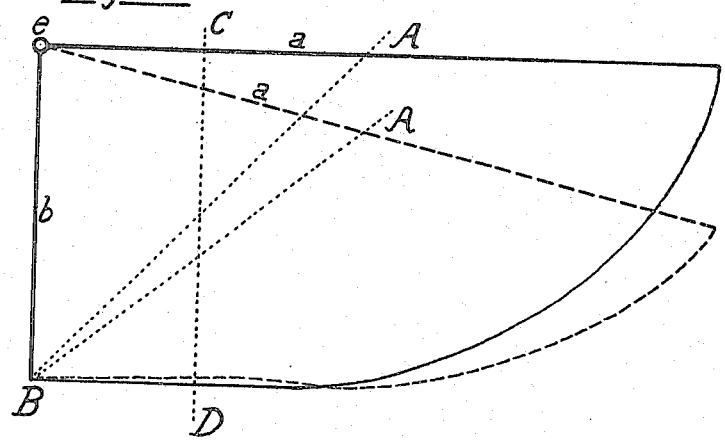
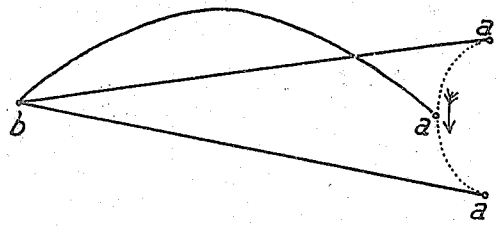
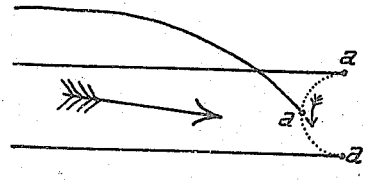
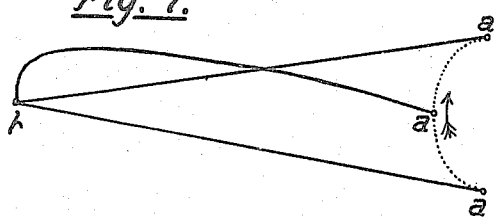
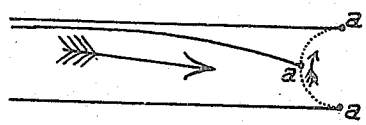
Witnesses:—
Charles B Crompton
May G. Luttrell
G. Vorndran.
Inventor.
By Croydon Marks
Attorney.

UNITED STATES PATENT OFFICE.

GEORG VORNDRAN, OF STUTTGART, GERMANY.

FLYING-MACHINE.

1,135,638.

Specification of Letters Patent. Patented Apr. 13, 1915.

Application filed May 31, 1913. Serial No. 771,056.

*To all whom it may concern:*

Be it known that I, GEORG VORNDRAN, a subject of the German Emperor, residing at No. 126 Kanonenweg, Stuttgart, Germany, have invented a certain new and useful Flying-Machine, of which the following is a specification.

It has already been proposed to construct flying machines with flapping wings similar to those of birds or insects, but such machines have not yet given any remarkable results. The reason for this is mainly due to the fact that hitherto erroneous ideas have been held as to the nature of the flight of birds and insects and the resulting high efficiency obtained by a small expenditure of power, or that the constructions have been based on false suppositions. From a theoretical point of view and with consideration of the conditions of solid bodies it is quite understandable that a body can be lifted by a comparatively small force and can be kept at a certain height, for instance, on a hook, by means of a leverage, provided there is a point of support against which this force can act. Generally, however, the air does not afford any such point of support because it is too easily displaced. The air presents a considerable resistance only when it is suddenly displaced, that is to say, with a rapidly increased velocity and in such a case it presents actually a tremendously great resistance and thereupon the secret of the flight of birds and insects is based. By the flapping wings known hitherto, for instance, by such wings which open or spread out in their downward movement and fold together in their upward movement, an appreciable and sufficient resistance of the air cannot be produced, because in every periodical to-and-fro movement the velocity is *nil* at the beginning and increases gradually to the middle position of the stroke and then decreases to *nil*. Therefore the air will gradually begin to move at the beginning of the downward stroke and will offer a resistance to the movement of the wing, but this resistance is not sufficiently great and does not correspond in efficiency to the expense of energy because the displacement does not occur suddenly. A great part of the work expended would be used for the movement of the air and only a small part of the work would be used for lifting the flying machine. The construction should be such that at the beginning of the downward stroke of the wings the air is not displaced at all or very little and so that it does not acquire any velocity in the downward direction until the wing has reached the middle point of the stroke and only then the wing should tend to displace suddenly the still air with a greater velocity which would then of course offer a very great resistance. The flight of birds and insects takes place in the manner set forth above.

The present invention has now for its object a mechanism for a flying machine with flapping wings based upon the above described principles.

Figure 2:
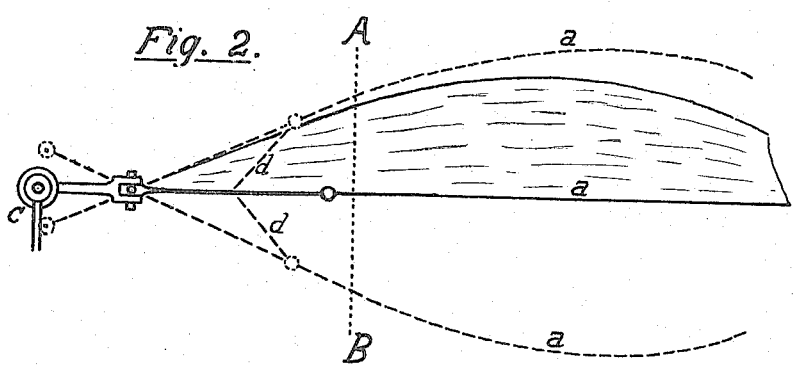
Figure 3:
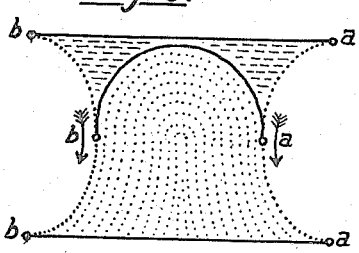
Figure 4:
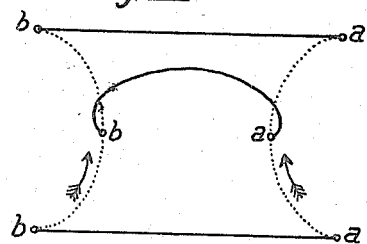

Figure 1 shows a plan view of the wing in the main positions, uppermost, middle, lowest. Fig. 2 is a front elevation showing said three positions. Fig. 3 is a cross-section on line A—B of Fig. 1 in a position of the downward movement. Fig. 4 is a cross-section in a position of the upward movement. Fig. 5 shows a plan view of another form of wing in different positions. Fig. 6 is a section on line A—B of Fig. 5 in a position of the downward movement. Fig. 7 is a similar section in a position of the upward movement. Fig. 8 a similar section on line C—D of Fig. 5 in a position of the downward movement. Fig. 9 is a section in a position of the upward movement.

The wing consists in a known manner of a series of flexible ribs $a$, $b$, which are covered with a suitable fabric. The ribs are movable relatively to each other in the usual manner in the plane of the wing, so that they can be moved toward and away from one another. By means of a suitable device, namely, a lever $c$ or the like, an oscillating movement is imparted to the wing. By means of rods or similar devices $d$, each movably connected to the ribs, $a$, $b$ and to a fixed point in the plane of the mean position of the wing, the ribs $a$, $b$ are moved alternately toward and away from each other in such a manner that the fabric between the ribs is alternately slackened and stretched. The coöperation of these two movements, namely, the oscillation of the wings and the moving of the ribs toward and away from each other, is so regulated that the fabric is stretched in the upper and lower end position of the stroke, while in the middle position of the wing the fabric is slackened and forms pocket-like recesses.

The section shown in Fig. 3 illustrates the manner in which the air is displaced by the wing during the downward movement or stroke. In the first half of the downward stroke, air represented by the horizontal dash lines is displaced, and the air represented by the dotted lines is displaced during the second half. At the moment the ribs pass the middle point of the downward stroke the air will have been displaced downward only to a slight extent so that the air has only attained a low mean velocity. From the middle of the downward stroke the ribs are moving away from each other so that the fabric of the wing again is stretched and the displaced air is compelled to rapidly assume the velocity of the ribs and may even exceed same. A great resistance of the air occurs due to the rapid increase of the velocity of the air displacement, which, similar to a solid body offers a good support to the flying machine to be lifted.

The upward movement of the wings is effected without expenditure of force by the pressure of the air and the fall of the body as well as by the elasticity of the ribs. The fabric of the ribs adapts itself to the air pressure so that no resistance occurs (see Fig. 4).

The motion of the wings does not require great power, because the air offers only a small resistance in the first part of the downward movement and if the air offers a considerable resistance owing to the rapid increase of the velocity of the air displacement, then the wing or motor has attained considerable *vis viva* prior to the excessive final effort.

In the construction shown in Figs. 5 to 9 the wing consists of an arm $a$ arranged nearly perpendicular to the longitudinal direction of the flying machine, and mounted on a ball or universal joint $e$ so that said arm can swing in half a conical surface, as shown by the sections Figs. 6 to 9. A second arm $b$ is arranged parallel to the longitudinal direction of the flying machine in such a manner that it intersects the arm $a$ at the point $c$. The triangle formed by $a$ and $b$ is covered with fabric. If the arm $a$ is moved up and down through a more or less semiconical path as shown in Figs. 6 to 9, so that the wings are more spread out in its upper and lower end position than in the middle position, then an action similar to that of the wing shown in Figs. 1 to 4 is produced.

Having now described my invention what I claim as new and desire to secure by Letters Patent is:—

1. In a flying machine the combination with flapping wings having relatively movable arms and intermediate stretched fabric, of means for moving the arms relatively nearer to each other during the first half of the downward stroke and relatively farther from each other during the second half of the downward stroke.

2. In a flying machine the combination with flapping wings having relatively movable arms and intermediate stretched fabric, of means for moving the arms relatively nearer to each other during the first half of the downward stroke and relatively farther from each other during the second half of the downward stroke comprising two rods each movably connected to said arms and to a fixed point in the plane of the mean position of the wing.

3. In a flying machine the combination with flapping wings having relatively movable arms and intermediate stretched fabric, of means for moving the arms relatively nearer each other during the first half of the downward stroke and relatively farther from each other during the second half of the downward stroke while one of the said arms is in a stationary position relatively to the flying machine body.

In testimony whereof I affix my signature in presence of two witnesses.

GEORG VORNDRAN.

Witnesses:
JOHANN OHMSTEDE,
PAULINE MÜLLER.